Patented Jan. 23, 1940

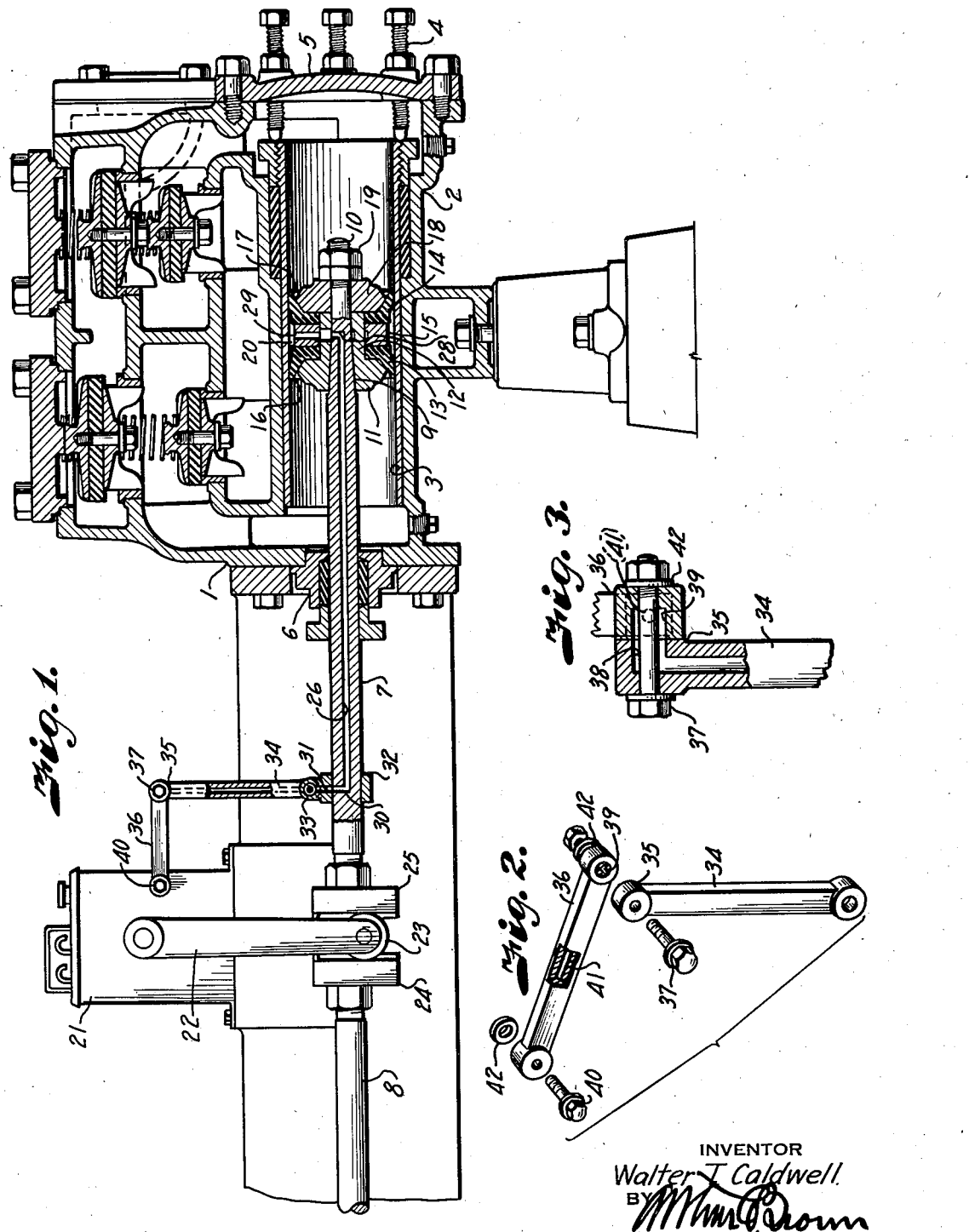

2,188,105

UNITED STATES PATENT OFFICE 2,188,105

LUBRICATING MECHANISM FOR RECIPROCATING PUMPS AND SIMILAR DEVICES

Walter T. Caldwell, Enid, Okla., assignor to The George E. Failing Supply Company, Enid, Okla., a corporation of Oklahoma Application December 13, 1937, Serial No. 179,462

2 Claims. (Cl. 184—18)

This invention relates to pumps and similar apparatus wherein a piston is mounted for reciprocatory movement, and has for its principal object to provide an apparatus of this character with positive means for lubricating the walls of the cylinder responsive to reciprocation of the piston.

It is also an important object of the invention to maintain pressure on the lubricant to counteract tendency of leakage of fluid past the packing heads of the piston.

In accomplishing these and other objects of the invention, as hereinafter pointed out, I have provided improved details of structure, the preferred form of which is illustrated in the accompanying drawing, wherein:

Fig. 1 illustrates a reciprocatory, double acting pump equipped with a lubricating mechanism embodying the features of the present invention.

Fig. 2 is a detail perspective view of the parts of the hinged pipe connecting the discharge of the lubricant pump with the piston rod, wherethrough the lubricant is supplied under pressure to the piston.

Fig. 3 is a detail sectional view through the intermediate joint of the pipe.

Referring more in detail to the drawing:

I designates a reciprocatory, double acting pump such as used in supplying a sludge or drilling fluid under pressure, and includes a horizontally arranged cylinder 2, having a lining 3, the lining being removably retained within the cylinder by set screws 4 that are threaded through the cylinder head 5 and arranged to engage a collar or packing gland that is carried on the liner, as in the usual manner.

Slidable through a stuffing box 6, at the opposite end of the cylinder, is a piston rod 7 having connection through a rod 8 with a suitable prime mover (not shown). The cylinder end of the piston rod is tapered, as at 9, and terminates in a reduced threaded extension 10. Mounted on the taper 9 is a piston head 11, having a hub portion or collar 12 for mounting packing cups 13 and 14 that are spaced apart by a plate 15. The packing cups 13 and 14 have oppositely arranged flexible, annular lips 16 and 17 respectively, overlying the peripheries of the head 11, and a complementary head 18 that is sleeved on the threaded extension and secured by jam-nuts 19 to form a tight piston assembly. The spacing plate 15 is of smaller circumference than the inner circumference of the liner to provide an annular lubricant containing chamber 20 between the packing cups 13 and 14, as clearly shown in Fig. 1.

In pumps handling abrasive containing fluids, such as sludge and the like, there is a tendency for the piston cups to cause scouring of the surface of the cylinder liner by the abrasive material for the reason that the pressure acting on the respective ends of the piston tends to force the abrasive material under the cups. As above pointed out it is an object of the present invention to overcome this difficulty by supplying the piston with lubricant to retain the working surfaces of the piston and cylinder sufficiently lubricated to prevent scouring and to provide the lubricant under sufficient pressure so as to counteract tendency of the pressure acting on the ends of the cylinder from causing leakage around the piston, as now to be described.

Mounted upon the framework of the pump, in relatively close proximity to the piston rod 7, is a lubricating pump 21 that is operated to supply lubricant under pressure by means of a rocker arm 22, having connection with the piston rod 7. In the illustrated instance the arm carries a roller 23 that is engaged on opposite diametrical sides thereof by the blocks or collars 24 and 25 attached to the rods 7 and 8, so that as the piston is reciprocated the rocker arm is oscillated to actuate the lubricating pump.

The piston rod 7 is provided with a longitudinal oil passageway 26 that terminates in a lateral port 27, registering with aligning radial passageways 28 and 29 in the hub 12 and spacing plate 15 and communicating with the annular chamber 20. The opposite end of the passage 26 terminates in a lateral port 30, having connection with a port 31 that is formed in a collar 32 attached to the rod 7. The collar 32 is provided with an ear 33 having pivotal connection with a tubular arm 34 of a jointed pipe 35, which also includes a tubular arm 36. The tubular arms 34 and 36 are pivotally connected by a suitable fastening device 37 extending through transverse lubricant passageways 38 and 39 communicating with the passageways of the tubular arms. The opposite end of the tubular arm 36 is pivotally connected with the outlet of the lubricating pump by means of a fastening device 40 on which the arm 36 is adapted to oscillate, the arm 36 having a lateral passageway 41 communicating with the pump. The fastening devices are provided with sealing washers 42 to prevent leakage of lubricant through the joints.

In operating a pump equipped with a lubricating mechanism constructed and assembled as described, reciprocation of the rod 7 to actuate the piston effects oscillation of the rocker arm 22 so that the pump 21 is effective in delivering lubricant under pressure to the inlet of the jointed pipe, and through the passageways therein to the passageway 26 in the rod from where the lubricant is delivered to the annular chamber about the piston. During reciprocation of the rod 7, the jointed pipe moves on its pivotal connections so that there is no interference with actuation of the rod. An adequate amount of lubricant is, therefore, supplied to the piston and cylinder walls and prevents abrasion normally caused by the sand and similar gritty materials contained in the drilling fluid. The oil supplied under pressure not only furnishes an ample amount of lubricant, but it also serves as a seal to prevent drilling fluid entering the ends of the piston.

It is obvious that a lubricating mechanism constructed as described may be readily applied to existing types of pumps or other driven units employing reciprocating pistons.

What I claim and desire to secure by Letters Patent is:

1. In an apparatus of the character described including a cylinder, a piston operable in the cylinder, a reciprocatory rod connected with the piston and having a lubricant passageway opening into the piston, means supplying lubricant to the piston including a lubricant pump, an operating connection between the pump and the piston rod, and a jointed swing pipe having pivotal connection with the discharge of the lubricating pump and with the passageway of the piston rod whereby lubricant discharged from said pump is delivered to the passageway of the piston rod during reciprocation of the piston.

2. In an apparatus of the character described including a cylinder, a piston operable in the cylinder, a reciprocatory rod connected with the piston and having a lubricant passageway opening into said piston, means supplying lubricant to the piston including a lubricant pump, an operating connection between the pump and the piston rod, a jointed swing pipe including a tubular arm having pivotal connection with the discharge of the lubricating pump, a tubular arm having pivotal connection with the piston rod, and a hinge joint connecting said arms and cooperating therewith to form a passageway connecting the pump discharge with said piston rod passageway.

WALTER T. CALDWELL.